United States Patent Office 3,154,283
Patented Oct. 27, 1964

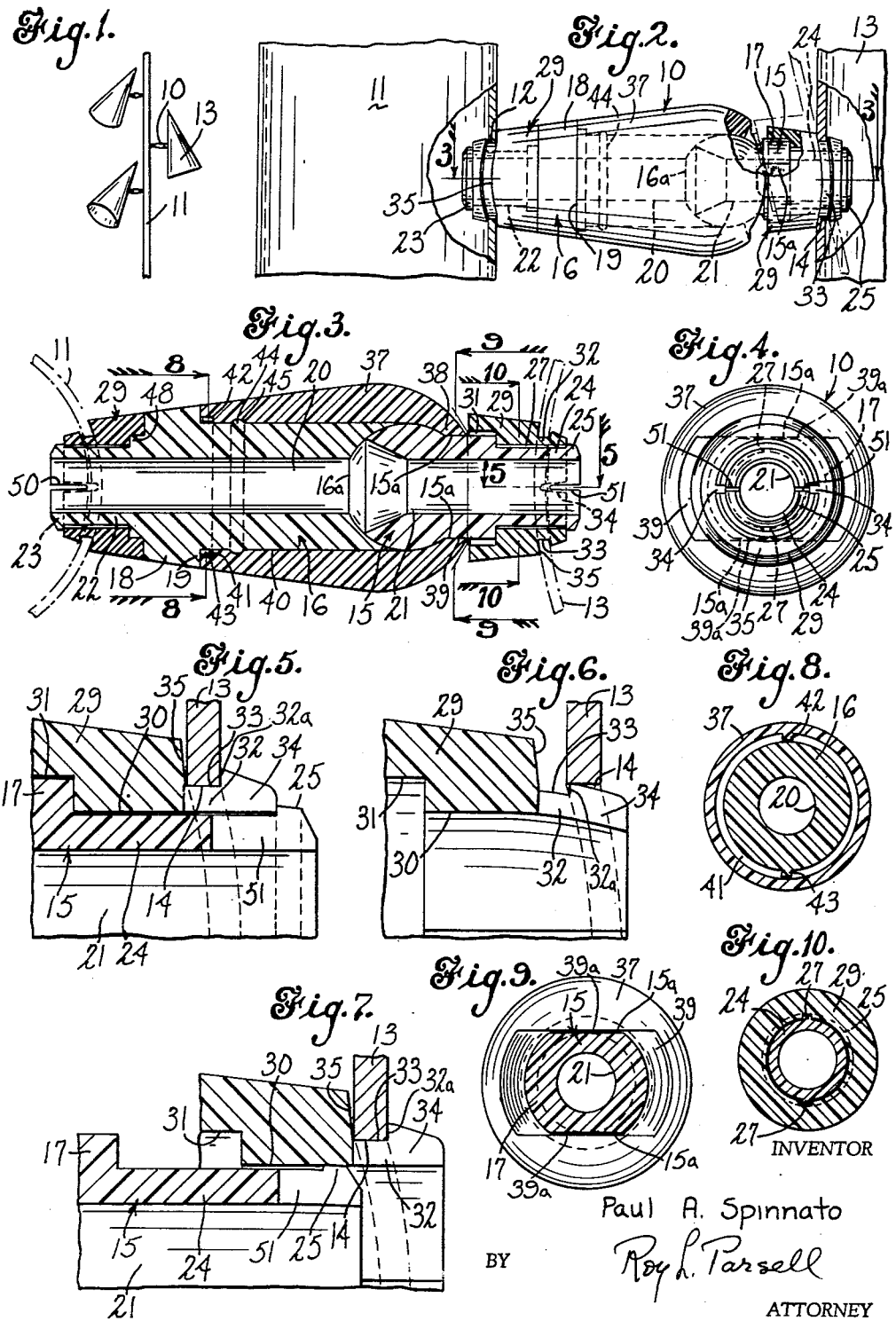

3,154,283
ADJUSTABLE LAMP BRACKET
Paul A. Spinnato, 69 Avon Road, Branford, Conn.
Filed May 25, 1962, Ser. No. 197,778
3 Claims. (Cl. 248—221)

This invention relates to lamp structures and more particularly to means for mounting a lamp housing to a tubular member such as a stanchion and the like.

One object of this invention is to provide a bracket for mounting a lamp housing to a tubular stanchion.

Another object is to provide a bracket which can be swiveled so that the lamp may be turned in a selected direction.

Another object is to provide a bracket which can easily be snapped into assembly and thus eliminate time consuming tightening of screws, nuts and bolts.

Still another object is to provide a bracket which may be snapped into place on a hollow stanchion or lamp housing and not require the necessity of backing up a rivet or holding on to a nut on the interior thereof.

Still another object of this invention is to provide a bracket which can be assembled from molded component parts thus eliminating expensive machining operations.

Other objects and a fuller understanding of the invention may be had by referring to the following description and claims, taken in conjunction with the accompanying drawings in which:

FIG. 1 shows the general type of application of the invention;

FIG. 2 is an elevation view showing in more detail the swivel bracket connected between the stanchion and lamp housing;

FIG. 3 is a horizontal cross section on line 3—3 of FIG. 2 and somewhat enlarged;

FIG. 4 is the end view of FIG. 3;

FIG. 5 is a cross section taken on line 5—5 of FIG. 3 and somewhat enlarged;

FIG. 6 corresponds to FIG. 5 showing bushing being inserted into lamp housing;

FIG. 7 corresponds to FIG. 6 showing bracket being inserted into bushing;

FIG. 8 is a cross section on line 8—8 of FIG. 3;

FIG. 9 is a cross section on line 9—9 of FIG. 3;

FIG. 10 is a cross section on line 10—10 of FIG. 3.

In the following description and in the claims, various details will be identified by specific names for convenience, but they are intended to be as generic in their application as the art will permit.

In the drawings like reference characters denote like parts in the several figures and in this description certain specific disclosure of the invention is made for purposes of explanation, but it will be understood that the details may be modified in various respects without departure from the broader aspects of the invention.

With reference to the drawing, the invention is illustrated as comprising a bracket generally indicated by the reference character 10, one end of which is secured to a stanchion 11 and the other end to a lamp housing 13.

The component parts of the bracket 10 may be of any suitable material having the necessary strength and flexibility. However in the preferred embodiment molded plastic produces strong accurate parts and the expense of machining is eliminated. A preferred composition is one having a flexural strength of between 8,000 and 16,000 p.s.i., compressive strength of 7,000 to 16,000 p.s.i. and a modulus of elasticity of 2.6 to $6.0 \times 10^5$ p.s.i. Examples of preferable materials are nylon or vinyl chloride compounds.

The bracket 10 comprises a socket arm 16 axially aligned with a ball arm 15 and secured end to end in movable relation to each other by means of a concentric sleeve or cover member 37 rotatable on the socket arm 16 as hereafter described.

One end of the cover member 37 is seated against a flange 18 on the socket arm 16 and held against longitudinal movement in the preferred form by an annular bead 44 molded on the surface of the socket arm 16 to cooperate with an annular groove 45 in the cover member 37.

The other end of the cover member 37 is provided with a constricted opening 39 having a pair of opposite parallel sides 39a through which protrudes the ball arm 15, which also has a pair of opposite parallel flat sides 15a to cooperate with the parallel sides 39a in the constricted opening 39 to permit a swinging movement of the ball arm 15 relative to the cover member 37 and to assist in retaining the ball arm 15 in axial alignment with the socket arm 16. Also the inside of the cover member 37 at this same end is hollowed out to partially correspond with the ball end of the ball arm 15 and permit movement of the ball arm 15 relative to the cover member 37 and at the same time further assist in retaining the ball arm 15 aligned against the socket 16a in the adjacent end of the socket arm 16 and to permit movement relative thereto.

The opposite or outside ends of the ball arm 15 and socket arm 16 are secured to the tubular stanchion 11 and the arcuate lamp housing 13 respectively by identical means described as follows.

Round holes 12 and 14 are provided in the sheet material walls of the stanchion and lamp housing respectively each to receive an anchor bushing 29. While the details of the structure for mounting the ball arm 15 to the lamp housing 13 is subsequently to be described, it is to be understood that the equivalent structure is followed for mounting of the socket arm 16 to the stanchion 11.

This anchor bushing 29 is provided with a sleeve portion 32 of smaller outside diameter extending through the hole 14 in the lamp housing 13.

Extending toward the end of the sleeve 32 for a distance substantially equal to the wall thickness of the lamp housing 13 (see FIG. 5), the outside diameter of sleeve 32 corresponds substantially to the diameter of the hole 14 in the lamp housing 13. At this point there is a sudden increase in outside diameter of the sleeve 32 forming a shoulder 32a on the sleeve which abuts the inside of the lamp housing 13 thus holding the wall of the lamp housing 13 between it and the shoulder 35 formed by the main portion of the bushing 29. The parallel walls of this circumferential groove 33 thus formed between the shoulders 35 and 32a is contoured (see FIG. 2) in a substantially normal plane to the axis of the sleeve 32 to conform to the inside and outside surfaces of the lamp housing. This contour prevents rotation of the bushing 29 relative to the lamp housing 13 when the bushing 29 is seated in hole 14 of the lamp housing 13.

While the preferred construction is for a round hole 14 in an arcuate housing wall 13, should it be desired to use a plane surface wall in lieu of the arcuate wall an elliptical or rectangular hole with a correspondingly shaped anchor bushing might be used to prevent rotation of the anchor bushing relative to the lamp housing.

Since a portion of the outside diameter of the sleeve 32 is larger than the hole 14 in the lamp housing 13, longitudinal radial slots 34 are cut in the sleeve 32 to form cantilever segments of the enlarged end of the sleeve 32 which deflect inwardly as the bushing 29 in inserted in the hole 13 (see FIG. 6) but return to normal position when the busing 29 is fully seated in place to abut the inside wall of the lamp housing 13.

The anchor bushing 29 is provided with a counterbore 31 to receive a shoulder 17 on the ball arm 15 as will be subsequently described.

The ball arm 15 is provided at the end protruding from the cover member 37 with a shoulder 17 and an extension portion or sleeve 24, the latter having an outside diameter corresponding to the inside diameter of the anchor bushing 29 and a circumferential bead 25 at the end thereof. This sleeve 24 is provided with longitudinal radial slots 51 which form cantilever segments of the wall of the sleeve 24 capable of slight inward deflection as the sleeve is thrust through the axial opening in the anchor bushing 29 and which return to normal position when the bead 25 is clear of the axial opening and thus the ball arm 15 is fully seated in the anchor bushing 29 and the latter locked in position by means of the outside diameter of the sleeve 24 pressing firmly against the inside diameter of the anchor bushing 29.

To prevent the ball arm 15 from rotating relative to the anchor bushing 29, ribs 27 are provided on the sleeve 24 (see FIG. 10) which cooperate with corresponding slots 34 in the anchor bushing sleeve 29.

Rotation not to exceed 360 degrees of the cover member 37 on the socket arm 16 is controlled by a stop pin 42 fixed in the counterbore 41 of the cover member 37 which cooperates with a stop pin 43 fixed to the socket arm.

The assembly and operation of the bracket 10 is as follows:

In assembling the bracket 10, the sleeve 32 end of the ball arm 15 is inserted in and through the larger opening in the cover member 37 until it protrudes through the opening 39 and the parallel flat sides 15a cooperate with the flat sides 39a in the opening 39 in the cover member 37 and the enlarged ball end rests against the interior hollowed out portion adjacent the end of the cover member 37. Next the cover member 37 containing the ball arm 15 is assembled to the socket arm 16 under longitudinal pressure to force the cover member 37 to abut the flange 18 against the locking resistance of the retaining ring or bead 44 until it is seated in the retaining groove 45 and to effect a tight fitting of the end of the ball arm against the adjacent end of the socket arm 16 and simultaneously to provide the tight fitting of the hollowed out portion inside of the cover member 37 against the enlarged ball of the ball arm 15.

The ball arm 15 is now movable relative to the cover member 37 in a plane parallel to the sides 39a and 15a. Also by rotating the cover member 37 about its longitudinal axis the ball arm 15 is given a rotative motion relative to the axis of the socket arm 16. The result of the combined motions is to give a universal movement of the ball arm 15 relative to the socket arm 16.

To enable the foregoing assembling procedure, the outside diameter of the socket arm 16; the inside diameter of the cover member 37; the axial distance between the bead 44 and the socket 162; the distance between the groove 45 and the constricted opening 39 in the cover, and the height of the bead 44 are relatively proportioned in combination with the modulus of elasticity of the material composing these component parts to permit the cover element 39 together with the ball arm 15 to be assembled to the socket arm 16 under the necessary pressure to retain the cover member 37 frictionally in place and at the same time exert frictional clamping action on the ball surface adjacent end of the ball arm 15.

In assembling the ball arm 15 to the lamp housing 13, the anchor bushing 29 is inserted under pressure into the hole 14 of the lamp housing 13 to flex the segments of sleeve 32 until the anchor bushing 29 enters sufficiently to become seated, that is, the circumferential groove 33 receives the edge of the hole 14 and the contoured edge 35 abuts the outside surface of the lamp housing 13. Next the ball arm 15 with the socket arm 16 and cover member 37 assembled thereto is attached to the lamp housing 13 by inserting the sleeve 24 with its circumferential bead 25 into the axial opening in the anchor bushing 29 at the same time the cantilever segments become deflected until the shoulder 17 seats in the counterbore 31 of the anchor bushing 29 and at the same time the bead 25 clears the anchor bushing 29 and the cantilever segments of the sleeve 32 resume their normal position in the anchor bushing 29. The cantilever segments in the anchor bushing 29 also become locked in place when the sleeve 32 is fully seated.

In like manner the socket arm 16 is mounted on the stanchion 11.

When it is desired to remove either or both ends of the bracket 10 from their respective mountings, the reverse procedure is followed.

Here, as in the case of the assembly of the socket arm 16 and the cover member 37, the respective diameters of the various component elements are determined relative to the modulus of elasticity of the particular material involved therein.

Axial passages are provided in both arms and bushings to receive electric wires for energizing an electric lamp contained in the lamp housing if desired.

While certain novel features of the invention have been disclosed herein, and are pointed out in the annexed claims, it will be understood that various omissions, substitutions and changes may be made by those skilled in the art without departing from the spirit of the invention.

What is claimed is:

1. A universally adjustable lamp bracket for attaching a lamp to a support comprising; first and second coaxial end-to-end arranged elements; the adjacent ends of said first and second elements being formed as socket and ball parts respectively of a universal joint; said second element having two opposite parallel sides adjacent said ball part; a sleeve cover turnable on said first element and having in one end thereof a socket portion engaging said ball part and cooperating with said socket in said first element to retain said ball part thereto; a transverse opening in the end of said sleeve cover and connecting with said socket portion thereof to receive said second element; said opening having two opposite parallel sides fittedly cooperating with said sides on said second element to confine the movement of said second element relative to said sleeve cover in a plane parallel to said sides and to couple said second element to said first element for joint rotation of said sleeve cover and said second element on said first element; the non adjacent end of one of said elements having a sleeve comprising a plurality of cantilever segments terminating in an external circumferential bead; an anchor bushing fittedly receiving said sleeve and having a tubular extension comprising a plurality of cantilever sections provided with an external circumferential shoulder.

2. In the device of claim 1 means for preventing rotation of said second element in relation to said bushing comprising companion rib and slot members one of which is mounted on the said second element and the other on said bushing respectively.

3. In the device of claim 2 the combination with an anchor bushing having a main portion and a tubular extension portion of lesser diameter provided with a plurality of cantilever segments terminating in respective circumferential shoulder sections spaced from said main portion.

References Cited in the file of this patent

UNITED STATES PATENTS

| | | |
|---|---|---|
| 2,592,130 | Erb | Apr. 8, 1952 |
| 2,632,660 | Krauthamer | Mar. 24, 1953 |
| 3,104,897 | Berger | Sept. 24, 1963 |

FOREIGN PATENTS

| | | |
|---|---|---|
| 735,846 | Great Britain | Aug. 31, 1955 |